(12) United States Patent
Li et al.

(10) Patent No.: US 12,092,919 B2
(45) Date of Patent: Sep. 17, 2024

(54) LIQUID CRYSTAL LENS, DISPLAY DEVICE AND DRIVING METHOD THEREFOR

(71) Applicant: BOE Technology Group Co., Ltd., Beijing (CN)

(72) Inventors: Zhongxiao Li, Beijing (CN); Wenqing Zhao, Beijing (CN); Kuanjun Peng, Beijing (CN); Jing Yu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/032,226

(22) PCT Filed: Dec. 23, 2020

(86) PCT No.: PCT/CN2020/138672
§ 371 (c)(1),
(2) Date: Apr. 17, 2023

(87) PCT Pub. No.: WO2022/133818
PCT Pub. Date: Jun. 30, 2022

(65) Prior Publication Data
US 2023/0400746 A1    Dec. 14, 2023

(51) Int. Cl.
*G02F 1/1335* (2006.01)
*G02B 3/14* (2006.01)
(Continued)

(52) U.S. Cl.
CPC ......... *G02F 1/133526* (2013.01); *G02B 3/14* (2013.01); *G02B 30/28* (2020.01); *G02F 1/294* (2021.01)

(58) Field of Classification Search
None
See application file for complete search history.

(56) References Cited

U.S. PATENT DOCUMENTS

| 8,279,362 B2 | 10/2012 | Yun et al. |
| 2015/0077669 A1 | 3/2015 | Wu |

(Continued)

FOREIGN PATENT DOCUMENTS

| CN | 103235462 A | 8/2013 |
| CN | 103472651 A | 12/2013 |

(Continued)

*Primary Examiner* — Dung T Nguyen
(74) *Attorney, Agent, or Firm* — ArentFox Schiff LLP; Michael Fainberg

(57) ABSTRACT

A liquid crystal lens liquid crystal lens includes: a first substrate and a second substrate; a liquid crystal layer including a plurality of liquid crystal lens units; a first electrode including a plurality of independent sub-electrodes, and there are sub-electrodes at adjacent positions of adjacent liquid crystal lens units; a second electrode being a planar electrode, the first electrode and the second electrode are configured to form an electric field to drive liquid crystal molecules of the liquid crystal layer to rotate, and adjust the curvature of the liquid crystal lens units; a first planar layer located on the side of the first electrode facing the liquid crystal layer, the first planar layer being configured to smooth an intensity variation curve of the electric field of the liquid crystal lens units; and a light-shielding layer located between the first substrate and the second substrate.

16 Claims, 13 Drawing Sheets

(51) Int. Cl.
  *G02B 30/28* (2020.01)
  *G02F 1/29* (2006.01)

(56) References Cited

U.S. PATENT DOCUMENTS

| | | | |
|---|---|---|---|
| 2015/0146115 A1 | 5/2015 | Liao et al. | |
| 2016/0054573 A1 | 2/2016 | Kasano et al. | |
| 2016/0363781 A1* | 12/2016 | Wu | G02F 1/13394 |
| 2018/0046002 A1 | 2/2018 | Zhao et al. | |
| 2018/0107089 A1 | 4/2018 | Zhao et al. | |
| 2019/0278131 A1 | 9/2019 | Li et al. | |
| 2021/0191175 A1 | 6/2021 | Niu et al. | |

FOREIGN PATENT DOCUMENTS

| | | |
|---|---|---|
| CN | 103744248 A | 4/2014 |
| CN | 103760712 A | 4/2014 |
| CN | 104020625 A | 9/2014 |
| CN | 104076572 A | 10/2014 |
| CN | 105404067 A | 3/2016 |
| CN | 105446028 A | 3/2016 |
| CN | 105954956 A | 9/2016 |
| CN | 106526993 A | 3/2017 |
| CN | 108508636 A | 9/2018 |
| CN | 109143671 A | 1/2019 |
| CN | 208969351 U | 6/2019 |

* cited by examiner

LIQUID CRYSTAL LENS, DISPLAY DEVICE AND DRIVING METHOD THEREFOR

This application is a National Stage of International Application No. PCT/CN2020/138672, filed on Dec. 23, 2020, which is hereby incorporated by reference in its entirety.

FIELD

The disclosure relates to the field of display technologies, and particularly to a liquid crystal lens, a display device, and a method for driving the same.

BACKGROUND

Owing to excellent performance and electrical focusing, Liquid Crystal Lenses are widely used in focusing apparatuses and human eye magnifying apparatuses, and especially have outstanding effects in 3D display. Application of the liquid crystal lenses can shake off the shackles of 3D glasses on human eyes, and achieve naked eye 3D display, thus having huge application prospects in the future.

SUMMARY

Embodiments of the disclosure provide a liquid crystal lens, including:
- a first substrate;
- a second substrate arranged opposite to the first substrate;
- a liquid crystal layer located between the first substrate and the second substrate and including a plurality of liquid crystal lens units;
- a first electrode located on a side of the first substrate facing the liquid crystal layer, the first electrode including a plurality of independent sub-electrodes, where each of the liquid crystal lens units corresponds to an identical number of the sub-electrodes, and there is a sub-electrode at an adjacent position between adjacent liquid crystal lens units;
- a second electrode located on a side of the second substrate facing the liquid crystal layer, the second electrode being a planar electrode; where the first electrode and the second electrode are configured to form an electric field to drive a liquid crystal molecule of the liquid crystal layer to rotate and adjust a curvature of the liquid crystal lens unit;
- a first planarization layer located on a side of the first electrode facing the liquid crystal layer, where the first planarization layer is configured to smooth an intensity variation curve of the electric field of the liquid crystal lens unit; and
- a light-shielding layer located between the first substrate and the second substrate, where an orthographic projection of the light-shielding layer on the first substrate covers an orthographic projection of the sub-electrode at the adjacent position between the adjacent liquid crystal lens units on the first substrate.

Optionally, in the above liquid crystal lens according to embodiments of the disclosure, the light-shielding layer is located between the second substrate and the second electrode, and the liquid crystal lens further includes a second planarization layer located between the light-shielding layer and the second electrode.

Optionally, in the above liquid crystal lens according to embodiments of the disclosure, the light-shielding layer is located between the first substrate and the first electrode, and the liquid crystal lens further includes a third planarization layer located between the light-shielding layer and the first electrode.

Optionally, in the above liquid crystal lens according to embodiments of the disclosure, the light-shielding layer is located between the first electrode and the first planarization layer, and a dielectric constant of the light-shielding layer is identical to a dielectric constant of the first planarization layer.

Optionally, in the above liquid crystal lens according to embodiments of the disclosure, the plurality of sub-electrodes is a plurality of strip-shaped sub-electrodes arranged in parallel with each other, the plurality of liquid crystal lens units is arranged in parallel, and an extension direction of the strip-shaped sub-electrodes is same as an extension direction of the liquid crystal lens units.

Optionally, in the above liquid crystal lens according to embodiments of the disclosure, the light-shielding layer includes a plurality of independent strip-shaped light-shielding parts, and there is one-to-one correspondence between the strip-shaped light-shielding parts and strip-shaped sub-electrodes at adjacent positions between adjacent liquid crystal lens units.

Optionally, in the above liquid crystal lens according to embodiments of the disclosure, the plurality of sub-electrodes corresponding to each of the liquid crystal lens units includes a planar sub-electrode and a plurality of annular sub-electrodes centered on the planar sub-electrode.

Optionally, in the above liquid crystal lens according to embodiments of the disclosure, the light-shielding layer includes a plurality of opening regions, and there is one-to-one correspondence between the opening regions and the liquid crystal lens units.

Optionally, in the above liquid crystal lens according to embodiments of the disclosure, the opening region has a triangular, square, or hexagonal shape.

Optionally, in the above liquid crystal lens according to embodiments of the disclosure, a width of the light-shielding layer corresponding to the adjacent position between adjacent liquid crystal lens units is greater than 20 um.

Optionally, the above liquid crystal lens according to embodiments of the disclosure further includes an electrode wiring, and sub-electrodes at same positions of the liquid crystal lens units are electrically connected with a same electrode wiring.

Optionally, the above liquid crystal lens according to embodiments of the disclosure further includes a first electrode wiring and a second electrode wiring, and the plurality of liquid crystal lens units is divided into liquid crystal lens units in a center region and liquid crystal lens units in an edge region; where
- sub-electrodes at same positions of the liquid crystal lens units in the center region are electrically connected with a same first electrode wiring, and sub-electrodes at same positions of the liquid crystal lens units in the edge region are electrically connected with a same second electrode wiring.

Accordingly, embodiments of the disclosure further provide a display device, including: a display panel and the above liquid crystal lens at a light-emitting side of the display panel according to embodiments of the disclosure.

Accordingly, embodiments of the disclosure further provide a method for driving the above display device according to embodiments of the disclosure, including:
- in a 3D display mode, applying a common voltage to the second electrode, and applying driving voltages to sub-electrodes in the first electrode corresponding to each of the liquid crystal lens units, to control liquid crystal in the liquid crystal layer to deflect and form a liquid crystal lens unit, and from a center to both edges of the liquid crystal lens unit, distributing the driving voltages applied to the sub-electrodes in a preset gradient.

Optionally, the above driving method according to embodiments of the disclosure further includes:

when it is determined that an alignment deviation occurs between the display panel and the liquid crystal lens, adjusting a corresponding relationship between the liquid crystal lens units and the sub-electrodes according to a determined offset amount between the liquid crystal lens and the display panel, so that the adjusted liquid crystal lens units cover corresponding viewpoint pixels within the display panel.

Optionally, the above driving method according to embodiments of the disclosure further includes:

when it is determined that a plurality of persons views the display device, adjusting a number of sub-electrodes corresponding to one of the liquid crystal lens units to a first number; and when it is determined that a single person views the display device, adjusting a number of sub-electrodes corresponding to one of the liquid crystal lens units to a second number; where the first number is greater than the second number.

Optionally, the above driving method according to embodiments of the disclosure further includes:

adjusting voltage signals applied to sub-electrodes corresponding to a liquid crystal lens unit at an edge of the liquid crystal lens, so that a focal length of a liquid crystal lens unit in an edge region is different from a focal length of a liquid crystal lens unit in a center region.

DETAILED DESCRIPTION OF EMBODIMENTS

Figure 1:
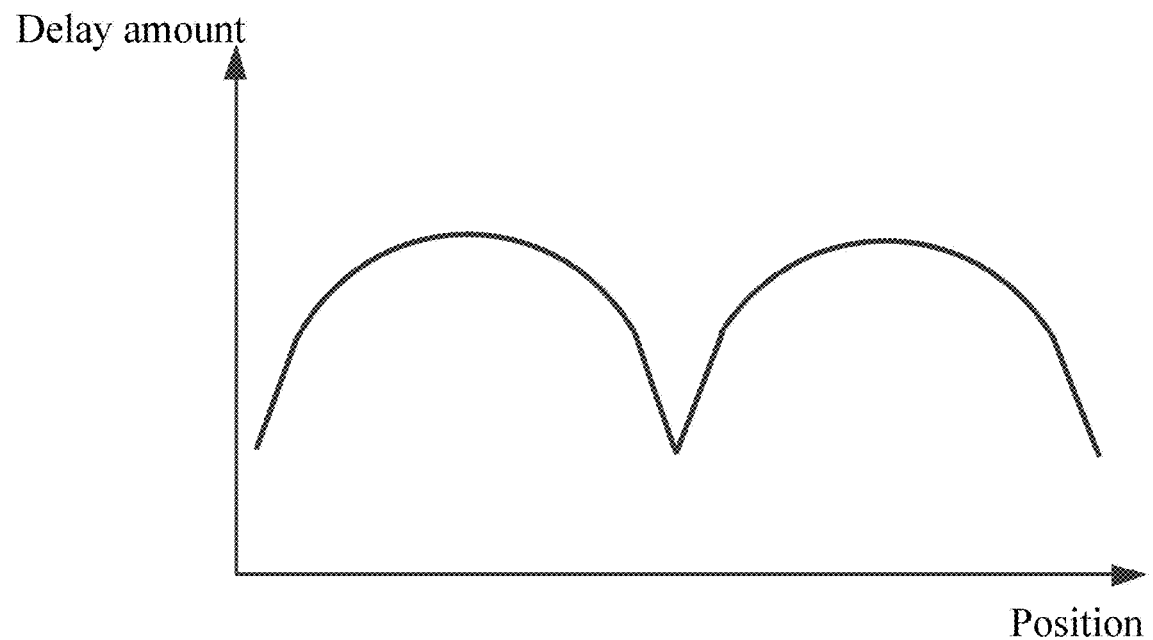
FIG. 1 is a schematic diagram of an optical delay curve of a liquid crystal lens.

To make objectives, technical schemes, and advantages of embodiments of the disclosure clearer, technical schemes in embodiments of the disclosure will be clearly and completely described below with reference to the accompanying drawings in embodiments of the disclosure. Obviously, the described embodiments are some but not all embodiments of the disclosure. Embodiments of the disclosure and features in embodiments may be combined with each other on a non-conflict basis. All other embodiments obtained by those of ordinary skills in the art based on the described embodiments of the disclosure without making creative work are encompassed within the scope of protection of the disclosure.

Unless otherwise defined, technical terms or scientific terms used in the disclosure should be of general meaning as understood by those with ordinary skills in the art to which the disclosure belongs. Similar words such as "including" or "comprising" used in the disclosure are intended to mean that elements or objects appearing in front of the words encompass elements or objects listed behind the words and equivalents thereof, without excluding other elements or objects. Similar words such as "connection" are not limited to physical or mechanical connections, but may include electrical connections, regardless of direct or indirect connections. Words, such as "inner," "outer," "upper," "lower," etc., are only used to represent a relative position relationship, and when absolute positions of described objects change, the relative position relationship may also change accordingly.

It should be noted that dimensions and shapes of figures in the drawings do not reflect real scales, and are only intended to illustrate contents of the disclosure. Further, identical or similar reference numerals represent identical or similar elements or elements having identical or similar functions throughout.

A liquid crystal lens is mostly used to replace a convex lens, achieves different focal lengths using different deflection degrees of liquid crystal, but can only replace a single lens, and has a narrow focal length adjustment range. A general method for implementing a liquid crystal lens is complex, and can achieve desired equivalent results of the lens and a desired optical delay curve only by applying different specific signals to a plurality of electrodes. During application to lens-type naked eye 3D display, a delay curve above an electrode strip between adjacent lenses has a poor appearance, thereby resulting in large crosstalk, affecting 3D effects, and restricting some applications of the liquid crystal lenses. The delay curve may be as shown in FIG. 1. The optical delay curve is not smooth due to different curvature radiuses at different positions. For example, a delay amount may be an optical path difference.

Figure 2:
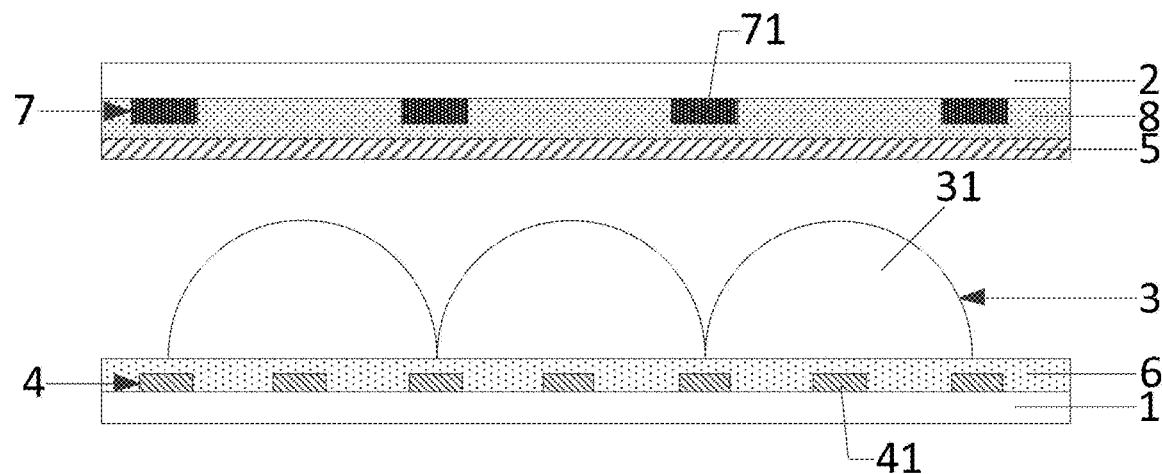
FIG. 2 is a specific schematic structural diagram of a liquid crystal lens according to an embodiment of the disclosure.
Figure 3:
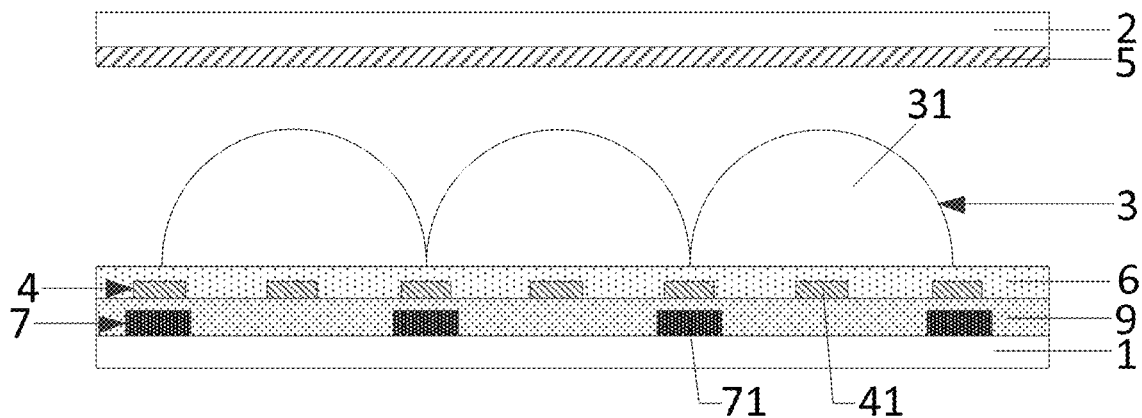
FIG. 3 is a specific schematic structural diagram of another liquid crystal lens according to an embodiment of the disclosure.
Figure 4:
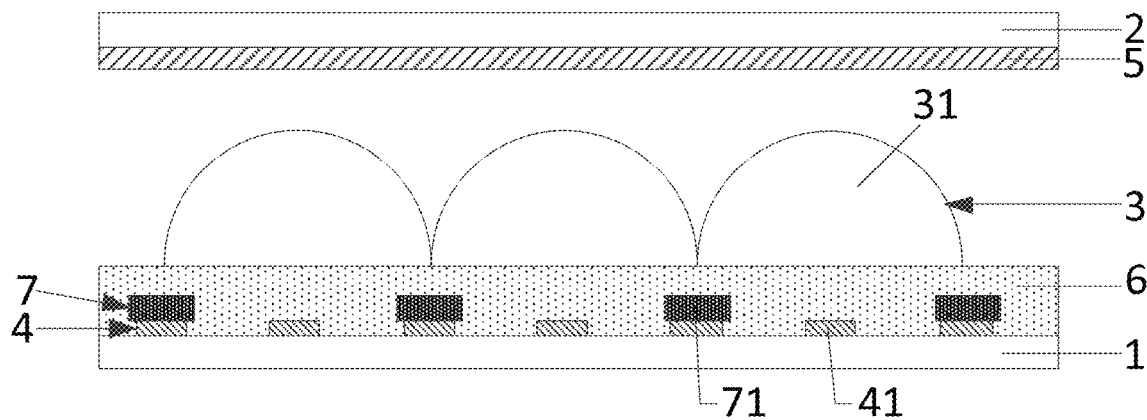
FIG. 4 is a specific schematic structural diagram of still another liquid crystal lens according to an embodiment of the disclosure.

Embodiments of the disclosure provide a liquid crystal lens, as shown in FIG. 2 to FIG. 4, including: a first substrate 1; a second substrate 2 arranged opposite to the first substrate 1; a liquid crystal layer 3 located between the first substrate 1 and the second substrate 2, the liquid crystal layer 3 including a plurality of liquid crystal lens units 31; a first electrode 4 located on a side of the first substrate 1 facing the liquid crystal layer 3, the first electrode 4 including a plurality of independent sub-electrodes 41, where each of the liquid crystal lens units 31 corresponds to an identical number of the sub-electrodes 41, and there is a sub-electrode 41 at an adjacent position between adjacent liquid crystal lens units 31; a second electrode 5 located on a side of the second substrate 2 facing the liquid crystal layer 3, the second electrode 5 being a planar electrode; where the first electrode 4 and the second electrode 5 are configured to form an electric field to drive a liquid crystal molecule of the liquid crystal layer 3 to rotate and adjust a curvature of the liquid crystal lens unit 31; a first planarization layer 6 located on a side of the first electrode 1 facing the liquid crystal layer 3, where the first planarization layer 6 is configured to smooth an intensity variation curve of the electric field of the liquid crystal lens unit 31; and a light-shielding layer 7 located between the first substrate 1 and the second substrate 2, where an orthographic projection of the light-shielding layer 7 on the first substrate 1 covers an orthographic projection of the sub-electrode 41 at the adjacent position between the adjacent liquid crystal lens units 31 on the first substrate 1.

In the above liquid crystal lens according to embodiments of the disclosure, on the one hand, voltages are applied to the first electrode 4 and the second electrode 5 to form an electric field between the first electrode 4 and the second electrode 5, such that, under the action of the electric field, a refractive index of the liquid crystal layer 3 changes, thereby adjusting a focal length of the liquid crystal lens unit 31; and on the other hand, the liquid crystal molecule is driven to deflect using the plurality of sub-electrodes 41, to achieve a parabolic distribution of optical phase delay amounts. However, due to the absence of an electrode structure in a gap region between two adjacent sub-electrodes, an optical delay amount may decrease in this region, thereby resulting in an unsmooth optical delay curve that affects performance of the liquid crystal lens. In embodiments of the disclosure, the first planarization layer 6 is provided on a side of the first electrode 4 facing the liquid crystal layer 3, to serve to planarize a film layer and underlay the liquid crystal lens unit 31, thereby smoothing the electric field, i.e., the delay curve is relatively smooth and has approximately identical curvature radiuses at different positions. In addition, because a simulated lens has a worst appearance at a connection position between formed adjacent liquid crystal lens units 31, the light-shielding layer 7 is provided to shield light at the connection position between the adjacent liquid crystal lens units 31. When the liquid crystal lens according to embodiments of the disclosure is applied to 3D display, backlight cannot be emitted through a region corresponding to the connection position between the adjacent liquid crystal lens units 31, thereby reducing light crosstalk at an adjacent position between the liquid crystal lens units 31, and decreasing a crosstalk value of the 3D display device.

As shown in FIG. 2 to FIG. 4, metal electrodes, such as aluminum electrodes, may serve as the first electrode 4 and the second electrode 5; or, transparent electrodes may serve as the first electrode 4 and the second electrode 5, for example, the first electrode 4 and the second electrode 5 may be fabricated from an indium tin oxide material. Because the above two electrodes fabricated from metal materials may affect light transmittance, the transparent electrodes are preferred for the above two electrodes.

As shown in FIG. 2 to FIG. 4, the light-shielding layer 7 may be made of a black metal material, a surface-blackened metal material, or a black matrix material.

As shown in FIG. 2 to FIG. 4, in order to ensure that the first planarization layer 6 can better smooth the electric field, a thickness of the first planarization layer 6 may be in a range of 0.5 um to 4 um, and the first planarization layer 6 may be made of an insulating resin material.

As shown in FIG. 2 to FIG. 4, the liquid crystal layer 3 may have a thickness of 15 um or more. In order to improve an accuracy of a shape of the liquid crystal lens, 21 or more strip-shaped sub-electrodes 41 cover below each liquid crystal lens unit 31, widths of the strip-shaped sub-electrodes 41 may be completely identical or partially identical, and gaps between adjacent strip-shaped sub-electrodes 41 may be completely identical or partially identical. For illustrative purposes, FIG. 2 to FIG. 4 in embodiments of the disclosure only schematically show 3 strip-shaped sub-electrodes 41 covering below each liquid crystal lens unit 31.

In a specific implementation, in the above liquid crystal lens according to embodiments of the disclosure, as shown in FIG. 2, the light-shielding layer 7 may be located between the second substrate 2 and the second electrode 5, i.e., the light-shielding layer 7 may be provided on the second substrate 2; and in order to planarize the light-shielding layer 7, the liquid crystal lens further includes a second planarization layer 8 located between the light-shielding layer 7 and the second electrode 5. The light-shielding layer 7 is provided on the second substrate 2, and the orthographic projection of the light-shielding layer 7 on the first substrate 1 covers the orthographic projection of the sub-electrode 41 at the adjacent position on the first substrate 1. Therefore, the light-shielding layer 7 can shield light at the connection position between the adjacent liquid crystal lens units 31. When the liquid crystal lens according to embodiments of the disclosure is applied to 3D display, backlight cannot be emitted through a region where the light-shielding layer 7 is located, thereby reducing the light crosstalk at the adjacent position between the liquid crystal lens units 31, and decreasing the crosstalk value of the 3D display device. The second planarization layer 8 may be made of an insulating resin material.

In a specific implementation, in the above liquid crystal lens according to embodiments of the disclosure, as shown in FIG. 3, the light-shielding layer 7 may be located between the first substrate 1 and the first electrode 4, and the liquid crystal lens further includes a third planarization layer 9 located between the light-shielding layer 7 and the first electrode 4. The light-shielding layer 7 is provided on the first substrate 1, and the light-shielding layer 7 is located below the sub-electrode 41 at the connection position between the adjacent liquid crystal lens units 31. When the liquid crystal lens according to embodiments of the disclosure is applied to 3D display, backlight cannot pass through the light-shielding layer 7, thereby reducing the light crosstalk at the adjacent position between the liquid crystal lens units 31, and decreasing the crosstalk value of the 3D display device. In addition, in the disclosure, the light-shielding layer 7 is provided on the first substrate 1, thus ensuring that a position of the light-shielding layer 7 is aligned with a position of the strip-shaped sub-electrode 41, and avoiding a deviation generated in a cell aligning process of the first substrate 1 and the second substrate 2 in FIG. 2. The fabrication process sequence in FIG. 3 includes: on the first substrate 1, fabricating the light-shielding layer 7, fabricating the third planarization layer 9, fabricating the strip-shaped sub-electrodes 41, and then fabricating the first planarization layer 6; and on the second substrate 2, only fabricating a planar second electrode. The third planarization layer 9 may be made of an insulating resin material.

In a specific implementation, in the above liquid crystal lens according to embodiments of the disclosure, as shown in FIG. 4, the light-shielding layer 7 may be located between the first electrode 4 and the first planarization layer 6, and a dielectric constant of the light-shielding layer 7 is identical to a dielectric constant of the first planarization layer 6. When the dielectric constant of the light-shielding layer 7 is identical to the dielectric constant of the first planarization layer 6, the light-shielding layer 7 has a same modulating action on the electric field as the first planarization layer 6, and therefore, the light-shielding layer 7 may be directly provided on the first substrate 4. Therefore, when the liquid crystal lens according to embodiments of the disclosure is applied to 3D display, backlight cannot pass through the light-shielding layer 7, thereby reducing the light crosstalk at the adjacent position between the liquid crystal lens units 31, and decreasing the crosstalk value of the 3D display device. In addition, compared with the scheme in FIG. 3, the scheme in FIG. 4 maintains a high alignment accuracy, thereby avoiding the impact of a cell alignment deviation, and simplifying the process flow. The planarization layer needs to be fabricated on the first substrate 1 only once. In addition, when the first electrode 4 is fabricated from a black metal material, the light-shielding layer 7 may be omitted, but a similar effect may still be achieved.

Figure 5:
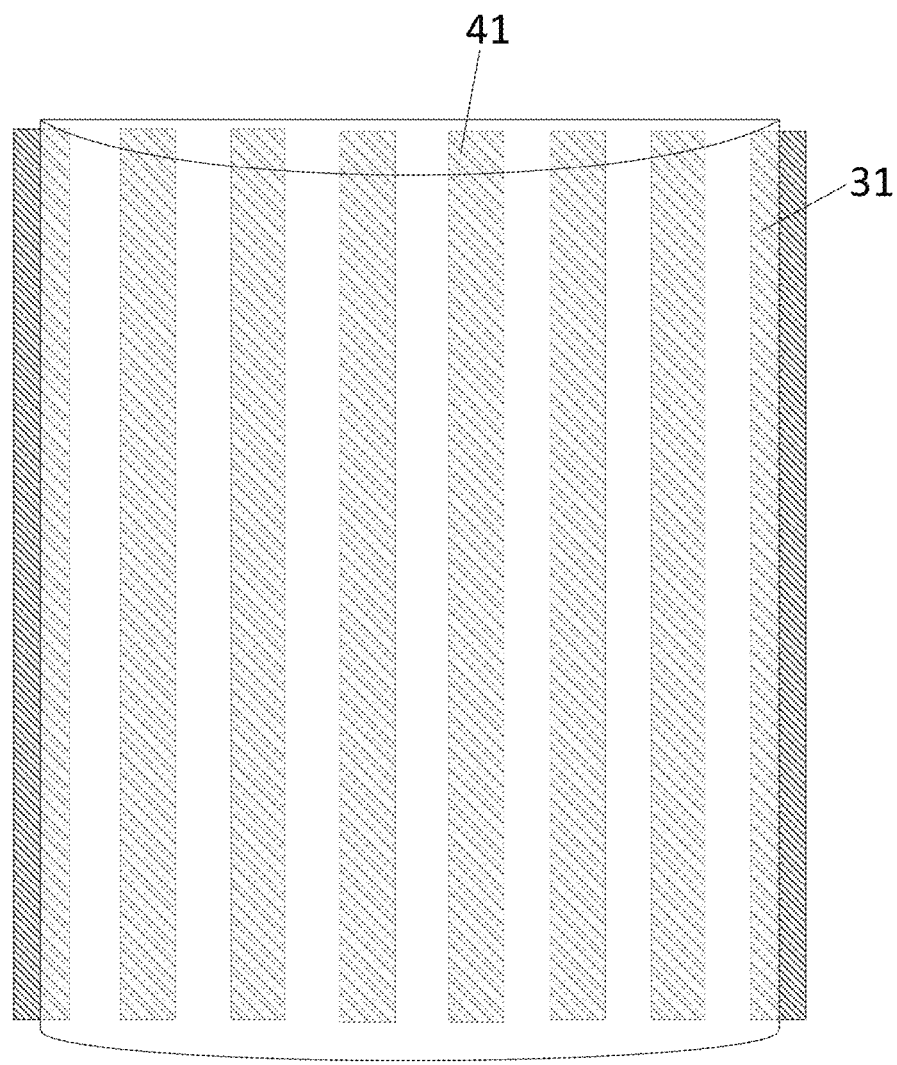
FIG. 5 is a schematic top view of sub-electrodes covered by a liquid crystal lens unit of a liquid crystal lens according to an embodiment of the disclosure.
Figure 6:
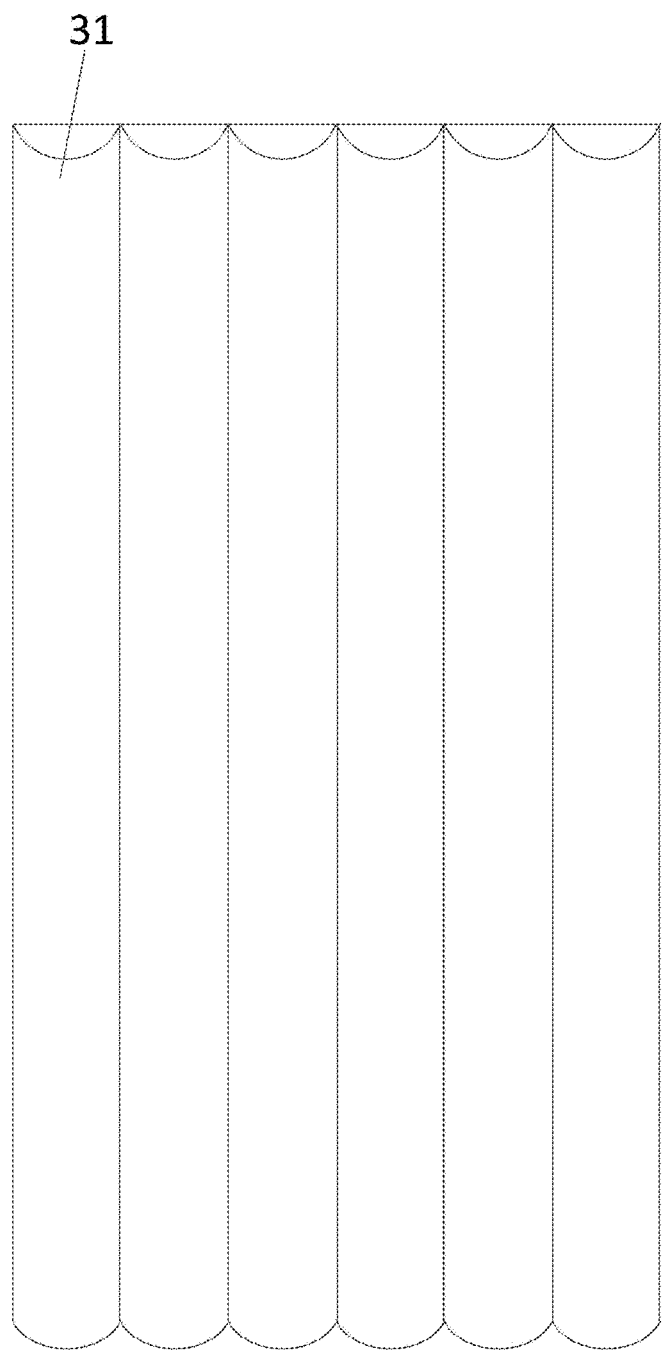
FIG. 6 is a schematic top view of a plurality of liquid crystal lens units of a liquid crystal lens according to an embodiment of the disclosure.

In a specific implementation, in the above liquid crystal lens according to embodiments of the disclosure, as shown in FIG. 5 and FIG. 6, FIG. 5 is a schematic structural top view of sub-electrodes 41 covered by a liquid crystal lens unit 31 in FIG. 2 to FIG. 4, FIG. 6 is a schematic diagram of a stereo structure of the plurality of liquid crystal lens units 31 in FIG. 2 to FIG. 4. The plurality of sub-electrodes 41 is a plurality of strip-shaped sub-electrodes arranged in parallel with each other. In FIG. 5, a liquid crystal lens unit 31, for example, covers 8 sub-electrodes 41. As shown in FIG. 6, the plurality of liquid crystal lens units 31 is arranged in parallel; and as shown in FIG. 5, an extension direction of the strip-shaped sub-electrodes 41 is same as an extension direction of the liquid crystal lens units 31. In embodiments of the disclosure, the plurality of strip-shaped sub-electrodes 41 is arranged in parallel with each other to achieve a cylindrical liquid crystal lens unit 31. A plurality of cylindrical liquid crystal lens units 31 is arranged in parallel to achieve a cylindrical grating in 3D display, thereby achieving 3D display through a liquid crystal lens in cooperation with a 2D display screen. In the liquid crystal lens according to embodiments of the disclosure, different voltage signals need to be applied to sub-electrodes covered by each liquid crystal lens unit, and a same voltage signal needs to be applied to sub-electrodes at a same position of different liquid crystal lens units, thereby adjusting a focal length of the lens by changing voltage values. For example, a drive signal may be applied to the first electrode 4, and the drive signal may be a square wave signal with identical positive and negative values. For example, a 60 Hz square wave signal with identical positive and negative values may be applied to the first electrode 4, and the second electrode 5 may be a common electrode, for example, a DC 0V signal may be applied to the second electrode 5.

As shown in FIG. 2 to FIG. 4 and FIG. 6, since two adjacent liquid crystal lens units 31 correspond to a same strip-shaped sub-electrode 41 at an adjacent position, the two adjacent liquid crystal lens units 31 may contact with each other at the adjacent position, thereby forming a tightly connecting liquid crystal lens, and achieving better 3D display effects during application to 3D display.

Figure 7:
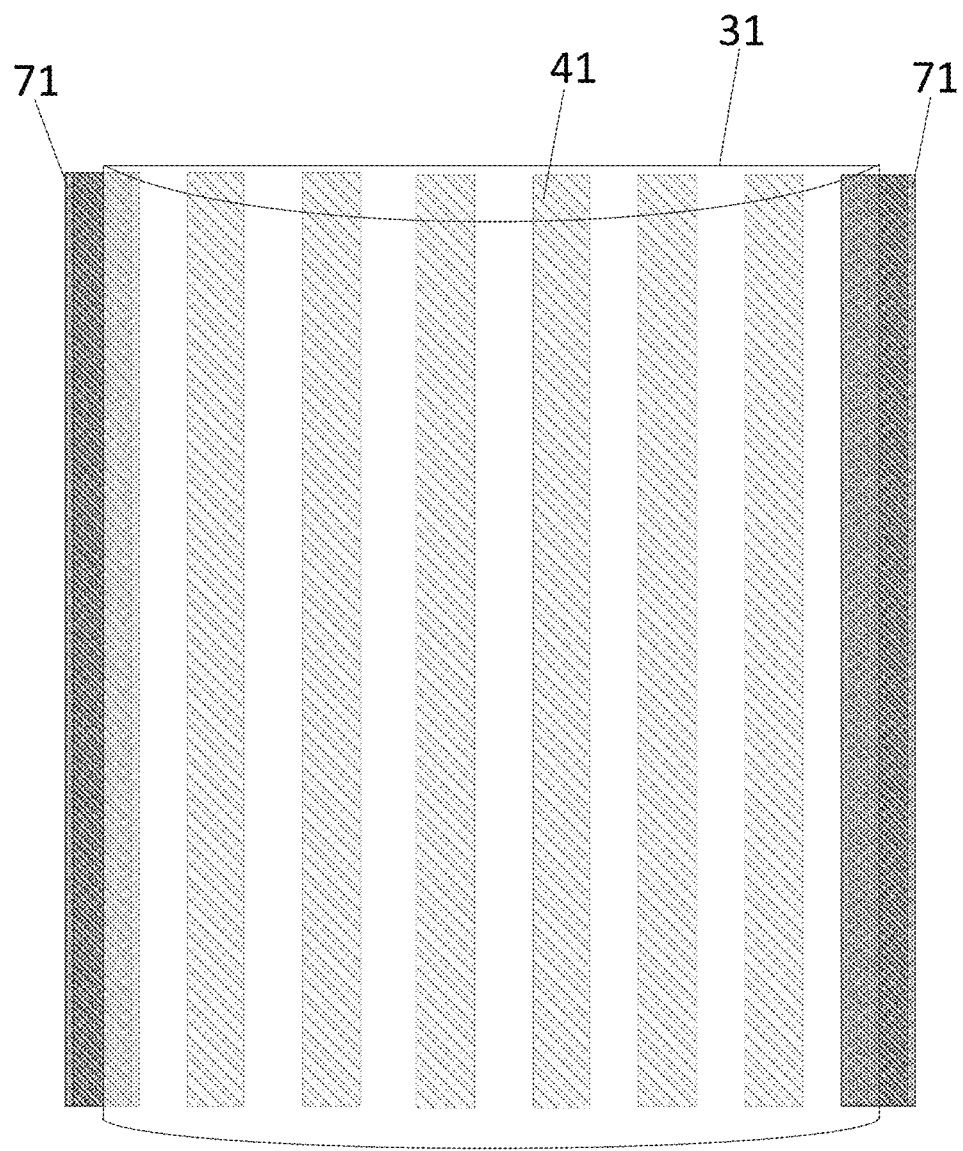
FIG. 7 is a schematic top view of a sub-electrode and a light-shielding layer covered by a liquid crystal lens unit of a liquid crystal lens according to an embodiment of the disclosure.

In a specific implementation, in the above liquid crystal lens according to embodiments of the disclosure, as shown in FIG. 2 to FIG. 4 and FIG. 7, the light-shielding layer 7 includes a plurality of independent strip-shaped light-shielding parts 71, and there is one-to-one correspondence between the strip-shaped light-shielding parts 71 and strip-shaped sub-electrodes 41 at adjacent positions between adjacent liquid crystal lens units 31. FIG. 7 is a schematic diagram of arranging strip-shaped light-shielding parts 71 on both sides of a liquid crystal lens unit 31.

Figure 8:
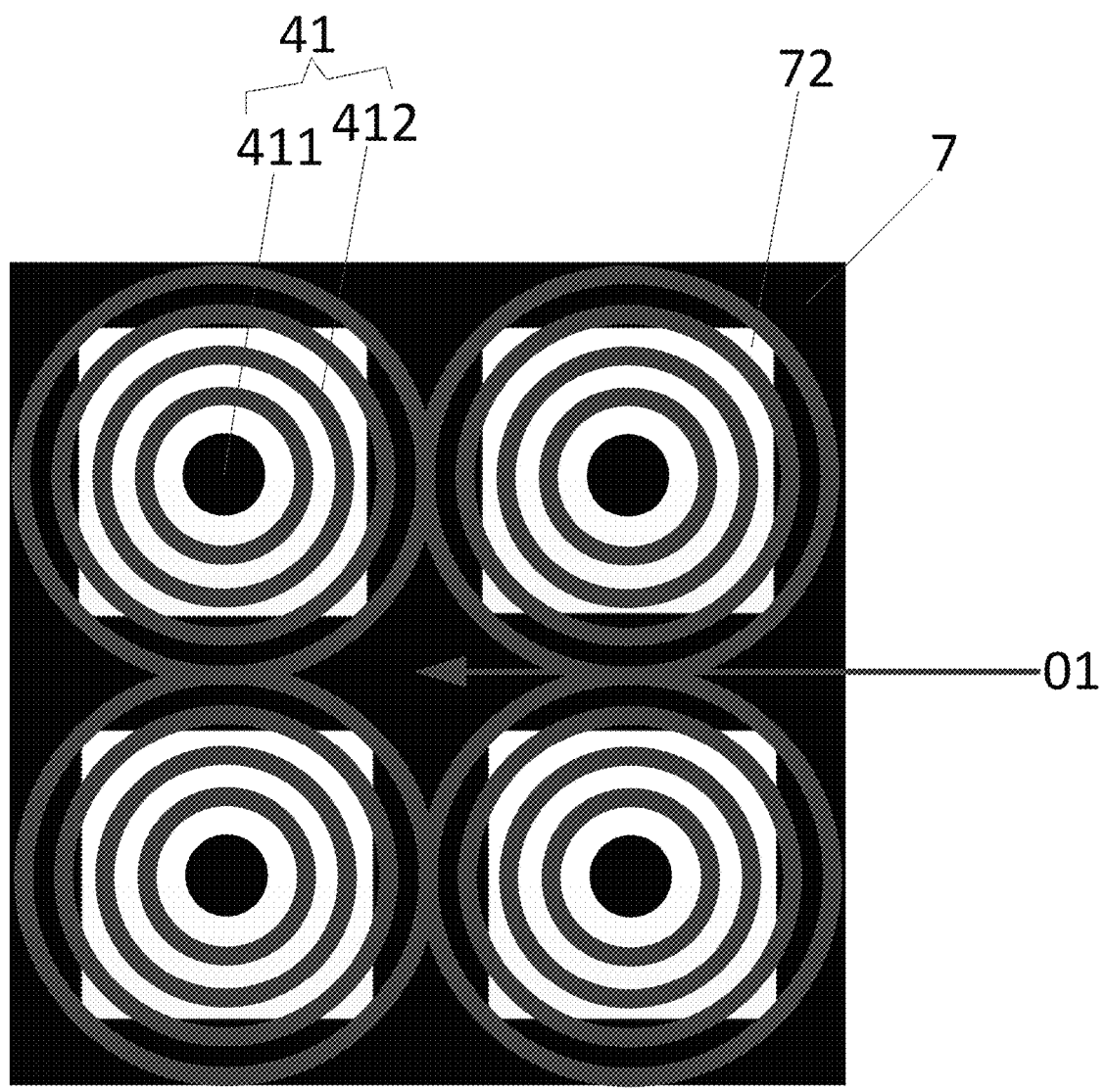
FIG. 8 is a schematic structural top view of a sub-electrode and a light-shielding layer according to an embodiment of the disclosure.
Figure 9:
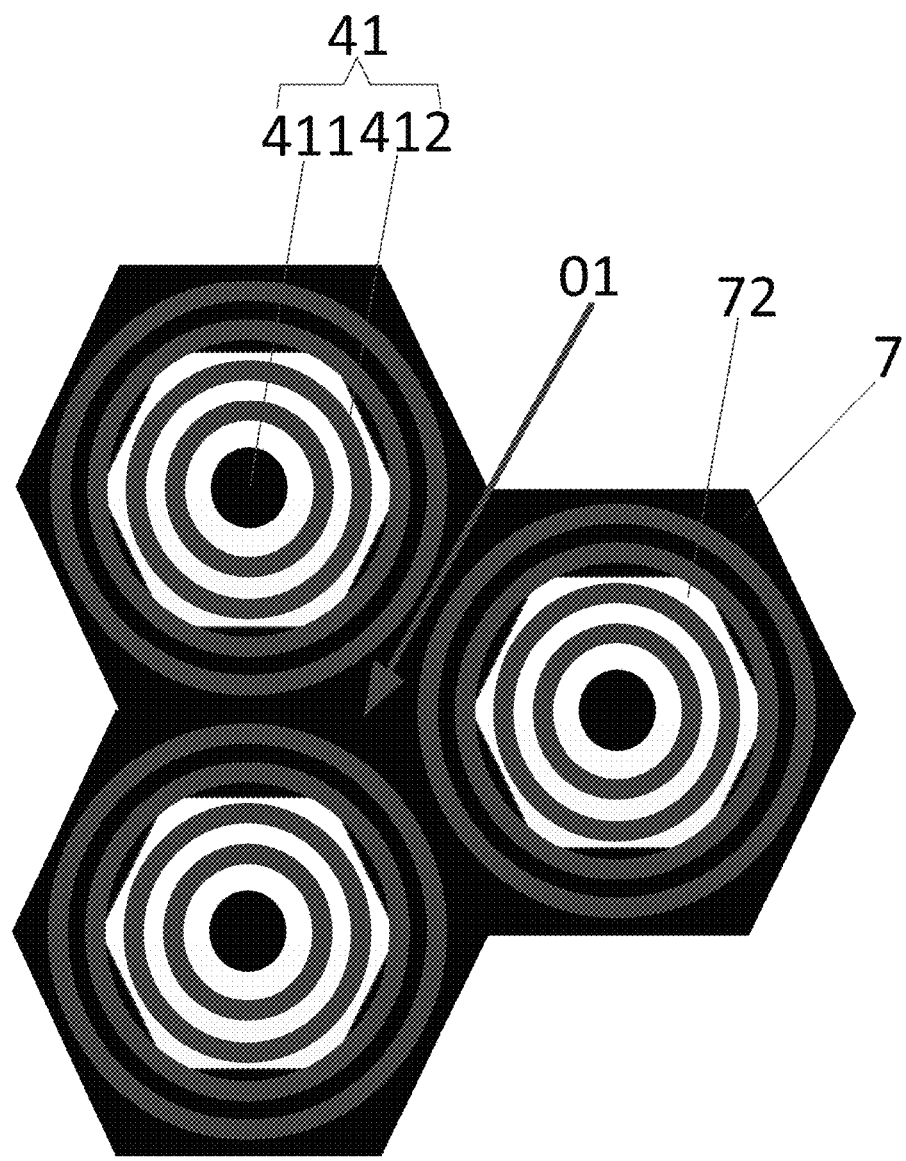
FIG. 9 is a schematic structural top view of another sub-electrode and another light-shielding layer according to an embodiment of the disclosure.

In a specific implementation, in the above liquid crystal lens according to embodiments of the disclosure, as shown in FIG. 8 and FIG. 9, the plurality of sub-electrodes 41 corresponding to each of the liquid crystal lens units 31 includes a planar sub-electrode 411 and a plurality of annular sub-electrodes 412 centered on the planar sub-electrode 411. The plurality of sub-electrodes 41 in FIG. 2 to FIG. 4 is arranged in this manner, thereby achieving a round liquid crystal lens unit configured to implement an optical function such as focusing. When the liquid crystal lens is in a working state, for a liquid crystal lens unit 31, an electric potential applied to the second electrode 5 is equal to an electric potential applied to the planar sub-electrode 411. When a liquid crystal molecule is a positive liquid crystal molecule, electric potentials applied to the planar sub-electrode 411 and the annular sub-electrodes 412 gradually increase sequentially from inside to outside; and when a liquid crystal molecule is a negative liquid crystal molecule, electric potentials applied to the planar sub-electrode 411 and the annular sub-electrodes 412 gradually decrease sequentially from inside to outside. As a result, liquid crystal molecules inside the liquid crystal lens unit 31 deflect under the action of an electric field, equivalent to a hemispherical lens.

All of the planar sub-electrode 411 and the annular sub-electrodes 412 have regular electrode patterns, for example, the planar sub-electrode 411 may have, e.g., a round or regular polygon shape. Optionally, an outer contour of at least one of the annular sub-electrodes 412 may be a round or regular polygon. The planar sub-electrode 411 is located at a center position of at least one of the annular sub-electrodes 412. A center of the planar sub-electrode 411 overlaps with a center of at least one of the annular sub-electrodes 412, and the planar sub-electrode 411 is equally spaced from the annular sub-electrodes 412, i.e., a shortest distance from each position at an inner edge of the annular sub-electrode 412 to the planar sub-electrode 411 is equal. The planar sub-electrode 411 is equally spaced from the annular sub-electrodes 412 to form a symmetrical electric field between the first electrode 4 and the second electrode 5 when voltages are applied to the first electrode 4 and the second electrode 5, so that deflection degrees of the liquid crystal molecules at symmetrical positions are consistent.

Further, as shown in FIG. 8 and FIG. 9, an inner contour and the outer contour of at least one of the annular sub-electrodes 412 have a same shape as an outer contour of the planar sub-electrode 411, and electrode patterns of the planar sub-electrode 411 and the annular sub-electrodes 412 are centrally symmetric patterns. That is, the pattern of the planar sub-electrode 411 and the patterns of the annular sub-electrodes 412 are consistent. For example, the planar sub-electrode 411 is a circle, the annular sub-electrodes 412 are circular rings, and optionally, the annular sub-electrodes 412 are circular rings concentric with the planar sub-electrode 411.

As shown in FIG. 8, the planar sub-electrode 411 is a round planar electrode; accordingly, the annular sub-electrodes 412 are circular ring electrodes; and a circle center of the planar sub-electrode overlaps with a circle center of at least one of the annular sub-electrodes. Of course, the planar sub-electrode 411 may also have, e.g., a square or regular polygon shape. In addition, the planar sub-electrode 411 may also have other regular polygon shapes. The annular sub-electrodes 412 and the planar sub-electrode 411 have same graphical contours, which are not enumerated here.

In a specific implementation, in the above liquid crystal lens according to embodiments of the disclosure, as shown in FIG. 8 and FIG. 9, the sub-electrodes 41 corresponding to each liquid crystal lens unit 31 include a planar sub-electrode 411 and a plurality of annular sub-electrodes 412 centered on the planar sub-electrode 411. For example, 4 groups of sub-electrodes 41 in FIG. 8 and three groups of sub-electrodes 41 in FIG. 9 are taken as examples, and a round liquid crystal lens unit 31 is formed accordingly above each group of sub-electrodes 41. Because round sub-electrodes cannot be tightly connected like strip-shaped sub-electrodes, there is a gap 01 between every four adjacent liquid crystal lens units 31 in FIG. 8, and there is a gap 01 between every three adjacent liquid crystal lens units 31 in FIG. 9. Liquid crystals in the gap 01 region are controlled by each electrode, and therefore, the liquid crystals in the gap 01 region are irregularly arranged. In order to further avoid light crosstalk through the gap 01 region, in embodiments of the disclosure, the light-shielding layer 7 is arranged to have an integral structure, the light-shielding layer 7 of the integral structure includes a plurality of opening regions 72, and there is one-to-one correspondence between the opening regions 72 and the liquid crystal lens units 31, equivalent to a fact that the light-shielding layer 7 is only exposed from regions corresponding to the liquid crystal lens units 31, thereby not only shielding annular sub-electrodes 412 between two adjacent liquid crystal lens units 31, but also shielding the gap 01 between the adjacent liquid crystal lens units 31, and further preventing the light crosstalk.

In a specific implementation, in the above liquid crystal lens according to embodiments of the disclosure, as shown in FIG. 8 and FIG. 9, the opening region 72 of the light-shielding layer 7 may have, e.g., a triangular, square, or hexagonal shape. As shown in FIG. 8, the opening region 72 has a square shape; as shown in FIG. 9, the opening region 72 has a regular hexagon shape; and of course, the opening region 72 may have a regular polygon shape, such as a regular octagon, and may be selected based on an opening shape of the liquid crystal lens unit 31.

Figure 10:
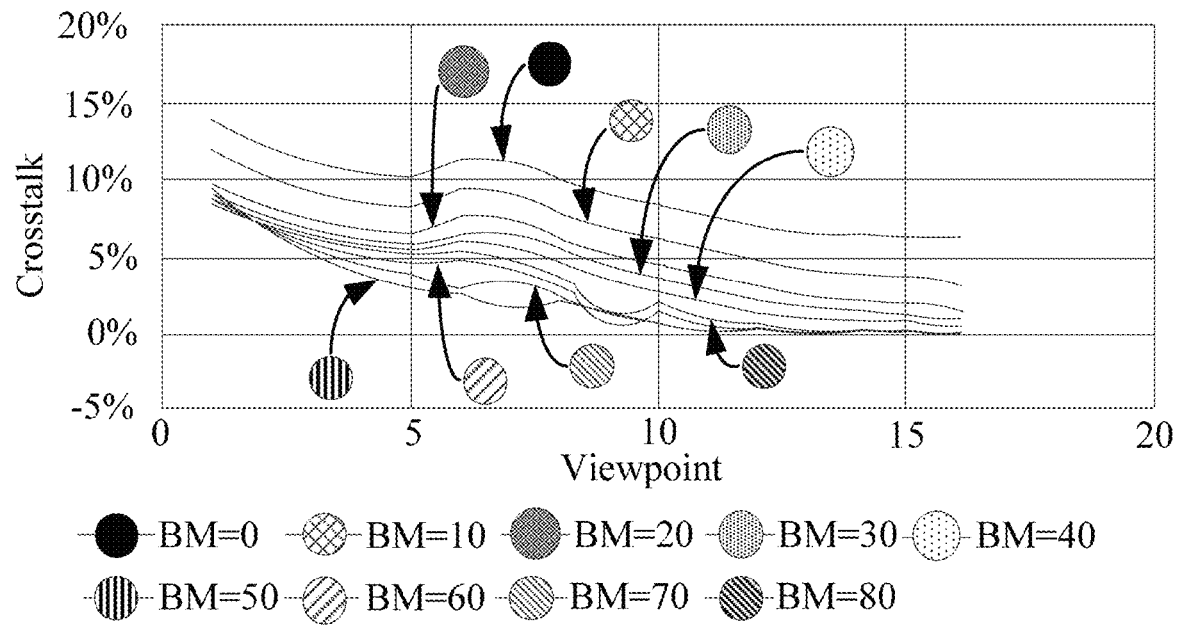
FIG. 10 is a schematic diagram of a relationship between a width of a light-shielding layer and a crosstalk value according to an embodiment of the disclosure.

The inventor of embodiments of the disclosure simulated a relationship between a size of the light-shielding layer 7 in FIG. 2 to FIG. 4 and the light crosstalk. As shown in FIG. 10, the abscissa is the number of viewpoints, and the ordinate is the crosstalk value. As can be seen, when the number of fixed viewpoints is fixed, an overall trend is that as the width of the light-shielding layer 7 (BM in FIG. 10 represents the light-shielding layer) increases, the crosstalk value decreases, where when the width of the light-shielding layer BM is greater than 20 um, the crosstalk value can be less than 10%. Therefore, in order to avoid the light crosstalk, in the above liquid crystal lens according to embodiments of the disclosure, as shown in FIG. 2 to FIG. 4, the width of the light-shielding layer 7 corresponding to the adjacent position between the adjacent liquid crystal lens units 31 is greater than 20 um. As shown in FIG. 7, the width of each strip-shaped light-shielding part 71 is greater than 20 um; and as shown in FIG. 8 and FIG. 9, a width of a light-shielding layer 7 between adjacent opening regions 72 is greater than 20 um.

In addition, the inventor of embodiments of the disclosure further found through optical simulation on the structure shown in FIG. 2 that light-shielding layers (BM) of different widths can improve focusing effects of the liquid crystal lens to different extents. A specific result is as shown in Table 1 below.

TABLE 1

| | | | | | |
|---|---|---|---|---|---|
| Design parameters | Lens aperture/um | 155.06 | 155.06 | 155.06 | 155.06 |
| | Width of light-shielding layer/um | 0 | 38 | 77.5 | 117 |
| | W/S/um | 2.5/5.25 & 2.51/5.25 | 2.5/5.25 & 2.51/5.25 | 2.5/5.25 & 2.51/5.25 | 2.5/5.25 & 2.51/5.25 |
| | Gap/um | 15 | 15 | 15 | 15 |
| | Vop/V | 2.2 | 2.2 | 2.2 | 2.2 |
| Liquid crystal result | PV % | 5.65% | 5.65% | 5.65% | 5.65% |
| Optical result | Spot diameter/um | 25.36 | 16.64 | 7.84 | 2.80 |
| | Focal length/mm | 3294.4 | 3300.6 | 3306.8 | 3313.0 |

W is a width of a sub-electrode 41, S is a gap width between adjacent sub-electrodes 41, Gap is a cell thickness of the liquid crystal lens, Vop is a driving voltage of the sub-electrode 41, and PV is an evaluation parameter, such as a fitting degree, of an appearance of a liquid crystal lens. As can be seen from Table 1, the light-shielding layer and the plurality of sub-electrodes 41 are added, such that the wider the width of the light-shielding layer is, the smaller the spot diameter is, and the better the imaging quality of the liquid crystal lens is. Further, the PV value is small, which also proves that the imaging quality of the liquid crystal lens is good. In addition, the result in Table 1 can achieve a focusing spot that is 1.8% of a liquid crystal lens period (lens aperture), and is very close to a result of an ideal lens, indicating that the scheme of embodiments of the disclosure can improve the imaging quality of the liquid crystal lens. Further, this result can meet requirements of a stereoscopic display technology such as naked eye 3D or light field display for the liquid crystal lens (with a radius of 5 um or less).

Figure 11:
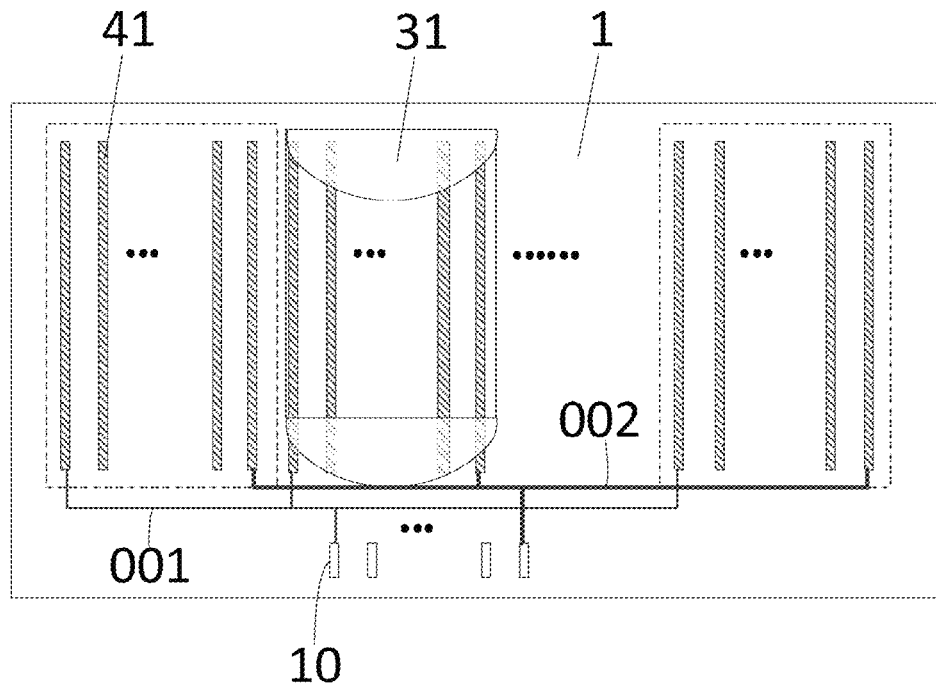
FIG. 11 is a schematic diagram of a connection relationship between a sub-electrode covered by a liquid crystal lens unit and an electrode wiring according to an embodiment of the disclosure.

In a specific implementation, in the above liquid crystal lens according to embodiments of the disclosure, as shown in FIG. 2 to FIG. 4, in a single liquid crystal lens unit 31, driving voltages of the sub-electrodes 41 at different positions of the second substrate 2 are different (or may be partially identical); and driving voltages of the sub-electrodes 41 at same positions between different liquid crystal lens units 31 are identical. As shown in FIG. 11, FIG. 11 is a schematic structural top view of FIG. 2 to FIG. 4, and further includes electrode wirings (001, 002, . . . ). In order to facilitate applying a same signal and saving the number of electrode wirings, sub-electrodes 41 at same positions of liquid crystal lens units 31 are electrically connected with a same electrode wiring. For example, FIG. 11 schematically shows three liquid crystal lens units 31, and schematically shows four corresponding strip-shaped sub-electrodes 41 of each liquid crystal lens unit 31, where first sub-electrodes 41 from the left of each of the liquid crystal lens units 31 are connected with a same electrode wiring 001; second sub-electrodes 41 from the left of each of the liquid crystal lens units 31 are connected with a same electrode wiring, . . . , second last sub-electrodes 41 of the liquid crystal lens units 31 are connected with a same electrode wiring, and last sub-electrodes 41 of the liquid crystal lens units 31 are connected with a same electrode wiring 002.

As shown in FIG. 11, the electrode wirings (001, 002, . . . ) are gathered into a bonding region, thus effectively reducing the number of bonding pins 10, reducing the number of driver chips (ICs), and achieving simplest driving on the premise of achieving a goal of same driving to form a liquid crystal lens.

Figure 12:
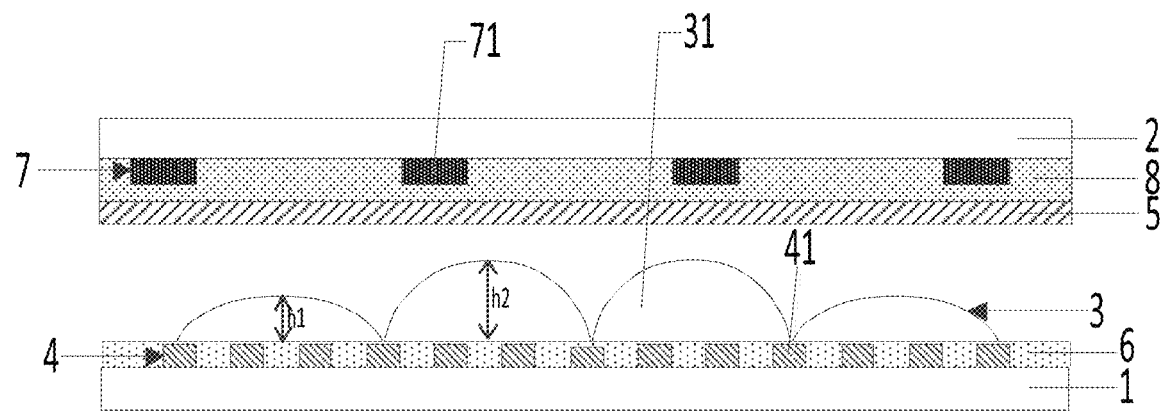
FIG. 12 is a schematic structural diagram of yet another liquid crystal lens according to an embodiment of the disclosure.
Figure 13:
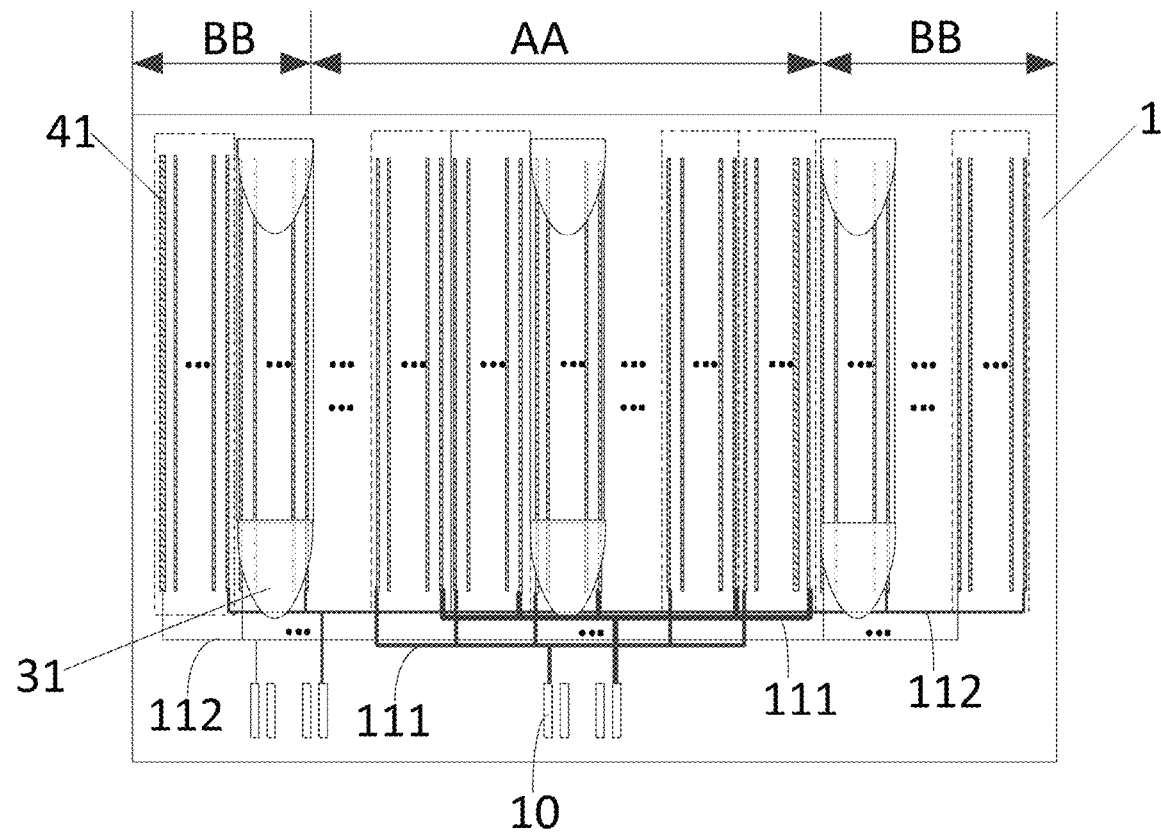
FIG. 13 is a schematic diagram of a connection relationship between a sub-electrode covered by a corresponding liquid crystal lens unit in FIG. 12 and an electrode wiring.

In a specific implementation, in the above liquid crystal lens according to embodiments of the disclosure, as shown in FIG. 12 and FIG. 13, FIG. 13 is a schematic structural top view of FIG. 12, and further includes a first electrode wiring 111 and a second electrode wiring 112. A plurality of liquid crystal lens units 31 is divided into liquid crystal lens units 31 in a center region AA and liquid crystal lens units 31 in an edge region BB.

Because an angle between light in the edge region BB and an optical axis of the liquid crystal lens is greater than an angle between light in the center region AA and the optical axis of the liquid crystal lens, aberration in the edge region BB is larger, resulting in poor imaging quality in the edge region BB. In order to improve the imaging quality in the edge region BB to achieve better 3D display quality, a liquid crystal lens unit 31 corresponding to a center region AA of a 2D display screen and a liquid crystal lens unit 31 corresponding to an edge region BB of the display screen are required to exhibit different focal length values, and the lens period remains unchanged, so that it is only necessary to change the wiring method and the driving method for the liquid crystal lens unit 31 to achieve different optical path distributions. As shown in FIG. 13, a whole substrate is divided, e.g., into a center region AA and an edge region BB. A wiring method within each region is as shown in the wiring method shown in FIG. 13. In embodiments of the disclosure, sub-electrodes 41 at same positions of liquid crystal lens units 31 in the center region AA are electrically connected with a same first electrode wiring 111. For example, FIG. 13 schematically shows 5 liquid crystal lens units 31 in the center region AA, where first sub-electrodes 41 from the left of each of the liquid crystal lens units 31 are electrically connected with a same first electrode wiring 111, second sub-electrodes 41 from the left of each of the liquid crystal lens units 31 are electrically connected with a same first electrode wiring 111, . . . , until last sub-electrodes 41 from the left of each of the liquid crystal lens units 31 are electrically connected with a same first electrode wiring 111. Sub-electrodes 41 at same positions of liquid crystal lens units 31 in the edge region BB are electrically connected with a same second electrode wiring 112. For example, FIG. 13 schematically shows 4 liquid crystal lens units 31 in the edge region BB, where first sub-electrodes 41 from the left of each of the liquid crystal lens units 31 are electrically connected with a same second electrode wiring 112, second sub-electrodes 41 from the left of each of the liquid crystal lens units 31 are electrically connected with a same second electrode wiring 112, . . . , until last sub-electrodes 41 from the left of each of the liquid crystal lens units 31 are electrically connected with a same second electrode wiring 112. The center region AA has its own independent drive signals U1, U2, . . . (U series), and the edge region BB has its own independent drive signals V1, V2, . . . (V series), thus increasing the number of required bonding pins 10 by 2 times. Focal lengths of the liquid crystal lens units 31 within each region are identical, but focal lengths of lenses in the edge region BB may be different from focal lengths of lenses in the center region AA, i.e., the drive signals of the V series are different from the drive signals of the U series. As shown in FIG. 12, the drive signals of the V series are applied to the sub-electrodes 41 corresponding to the liquid crystal lens units 31 in the edge region BB, and the drive signals of the U series are applied to the sub-electrodes 41 corresponding to the liquid crystal lens units 31 in the center region AA, so that focal lengths of the liquid crystal lens units 31 in the edge region BB are different from focal lengths of the liquid crystal lens units 31 in the center region AA, for example, the focal lengths of the liquid crystal lens units 31 in the edge region BB are larger than the focal lengths of the liquid crystal lens units 31 in the center region AA, i.e., arch heights h1 of the liquid crystal lens units 31 in the edge region BB are smaller than arch heights h2 of the liquid crystal lens units 31 in the center region AA, thereby improving the imaging quality of the edge region BB. The focal lengths of the liquid crystal lens units 31 in the edge region BB and the focal lengths of the liquid crystal lens units 31 in the center region AA may be designed as required.

It should be noted that, as shown in FIG. 11 and FIG. 13, when the drive signals of the V series are same as the drive signals of the U series, the example in FIG. 13 is same as the example in FIG. 11. According to design requirements, the liquid crystal lens may be divided into more regions, the number of bonding pins may be multiplied accordingly, and the number of required drive signals will also be increased accordingly.

As shown in FIG. 13, the first electrode wirings 111 and the second electrode wirings 112 are gathered into a bonding region, thus effectively reducing the number of bonding pins 10, reducing the number of driver chips (ICs), and achieving simplest driving on the premise of achieving a goal of same driving to form a liquid crystal lens.

It should be noted that the liquid crystal lens according to embodiments of the disclosure further includes other film layers required to achieve other lens functions, such as an alignment film layer of liquid crystal. The other film layers are not directly associated with the technical problems to be solved in the disclosure, and therefore will not be detailed one by one here.

Figure 14:
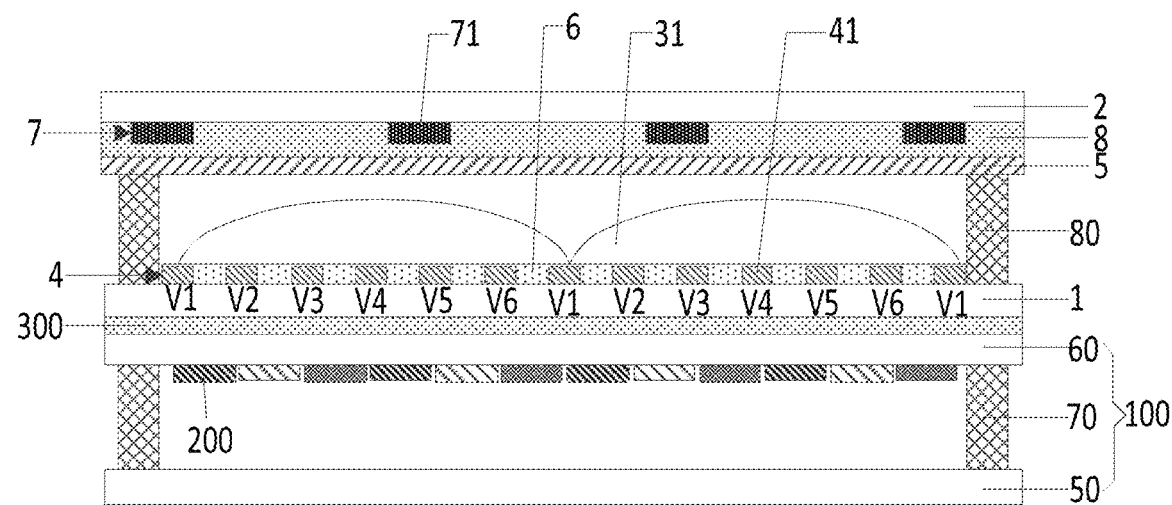
FIG. 14 is a schematic structural diagram of a display device according to an embodiment of the disclosure.

Based on a same inventive concept, embodiments of the disclosure further provide a display device, as shown in FIG. 14, including: a display panel 100 (2D display screen) and the liquid crystal lens (FIG. 2 to FIG. 4) at the light-emitting side of the display panel 100 as mentioned above, e.g., the liquid crystal lens in the structure in FIG. 2 is schematically shown.

As shown in FIG. 14, the display panel 100 may be a liquid crystal display device, or an organic light-emitting diode display device, or other display devices, which is not limited here. Each liquid crystal lens unit 31 is driven by lower sub-electrodes 41, each liquid crystal lens unit 31 is required to be driven by a plurality of sub-electrodes 41, and a period of the sub-electrode 41 is identical to a width of the sub-electrode 41. For example, a period of the liquid crystal lens unit 31 is 155 um. Embodiments of the disclosure may be designed using 21 sub-electrodes 41, where the width of the sub-electrode 41 may be 2.5 um, and a gap width between adjacent sub-electrodes 4 may be 5.25 um. In FIG. 14, for example, each liquid crystal lens unit 31 corresponds to 7 sub-electrodes 41. In actual design, the number of sub-electrodes 41 corresponding to each liquid crystal lens unit 31 may reach 20 or more. The display panel 100 includes a plurality of subpixels distributed in an array, and each liquid crystal lens unit 31 may correspond to a plurality of subpixels to form a plurality of view regions. In FIG. 14, for example, there are 6 view regions 200. In practical applications, there may be dozens of view regions.

As shown in FIG. 14, the display panel 100 and the liquid crystal lens are aligned and bonded together using a bonding layer 300, the bonding layer 300 may include an optical clear adhesive (OCA). The display panel 100 includes a third substrate 50 and a fourth substrate 60 arranged opposite to each other, and the third substrate 50 and the fourth substrate 60 are bonded together through a first frame sealing adhesive 70. For example, the display panel 100 is an organic light-emitting display panel, the display panel 100 further includes other structures, such as a drive circuit layer, a light-emitting device, an encapsulation layer, etc., that are well known to those skilled in the art and are located between the third substrate 50 and the fourth substrate 60. A structure of the display panel 100 is same as a structure in the related art, and will not be detailed here. The first substrate 1 and the second substrate 2 of the liquid crystal lens are bonded together through a second frame sealing adhesive 80.

In the above display device according to embodiments of the disclosure, on the one hand, voltages are applied to the first electrode 4 and the second electrode 5 in the liquid crystal lens to form an electric field between the first electrode 4 and the second electrode 5, such that, under the action of the electric field, a refractive index of the liquid crystal layer 3 changes, thereby adjusting the focal lengths of the liquid crystal lens units 31; and on the other hand, drives a liquid crystal molecule is driven to deflect using the plurality of sub-electrodes 41, to achieve a parabolic distribution of optical phase delay amounts. However, due to the absence of an electrode structure in a gap region between two adjacent sub-electrodes, an optical delay amount may decrease in this region, thereby resulting in an unsmooth optical delay curve that affects performance of the liquid crystal lens. In embodiments of the disclosure, the first planarization layer 6 is provided on a side of the first electrode 4 facing the liquid crystal layer 3, to serve to planarize a film layer and underlay the liquid crystal lens unit 31, thereby smoothing the electric field, i.e., the delay curve is relatively smooth and has approximately identical curvature radiuses at different positions. In addition, because a simulated lens has a worst appearance at a connection position between formed adjacent liquid crystal lens units 31, the light-shielding layer 7 is provided to shield light at the connection position between the adjacent liquid crystal lens units 31. When the liquid crystal lens according to embodiments of the disclosure is applied to 3D display, backlight cannot be emitted through a region corresponding to the connection position between the adjacent liquid crystal lens units 31, thereby reducing light crosstalk at an adjacent position between the liquid crystal lens units 31, and decreasing a crosstalk value of the 3D display device.

Based on a same inventive concept, embodiments of the disclosure further provide a method for driving the above display device, e.g., the structure shown in FIG. 14. The method may include: in a 3D display mode, applying a common voltage to the second electrode 5, and applying driving voltages to sub-electrodes 41 in the first electrode 4 corresponding to each of the liquid crystal lens units 31, to control liquid crystal in the liquid crystal layer 3 to deflect and form a liquid crystal lens unit 31, and from a center to both edges of the liquid crystal lens unit 31, distributing the driving voltages applied to the sub-electrodes 41 in a preset gradient. For example, the sub-electrodes 41 are, e.g., strip-shaped sub-electrodes, and when a liquid crystal molecule is a positive liquid crystal molecule, the driving voltages applied to the sub-electrodes 41 gradually increase from a center to both edges of the liquid crystal lens unit 31; and when a liquid crystal molecule is a negative liquid crystal molecule, the driving voltages applied to the sub-electrodes 41 gradually decrease from the center to both edges of the liquid crystal lens unit 31.

The above driving method according to embodiments of the disclosure applies voltages to the first electrode 4 and the second electrode 5 in the liquid crystal lens to form an electric field between the first electrode 4 and the second electrode 5. Under the action of the electric field, a refractive index of the liquid crystal layer 3 changes, thereby adjusting focal lengths of the liquid crystal lens units 31. On the other hand, in embodiments of the disclosure, the first planarization layer 6 is provided on a side of the first electrode 4 facing the liquid crystal layer 3, to serve to planarize a film layer and underlay the liquid crystal lens unit 31, thereby smoothing the electric field, i.e., the delay curve is relatively smooth and has approximately identical curvature radiuses at different positions. In addition, in the disclosure, the light-shielding layer 7 is provided to shield light at a connection position between adjacent liquid crystal lens units 31. When the liquid crystal lens according to embodiments of the disclosure is applied to 3D display, backlight cannot be emitted through a region corresponding to the connection position between the adjacent liquid crystal lens units 31, thereby reducing light crosstalk at an adjacent position between the liquid crystal lens units 31, and decreasing a crosstalk value of the 3D display device.

Figure 15A:
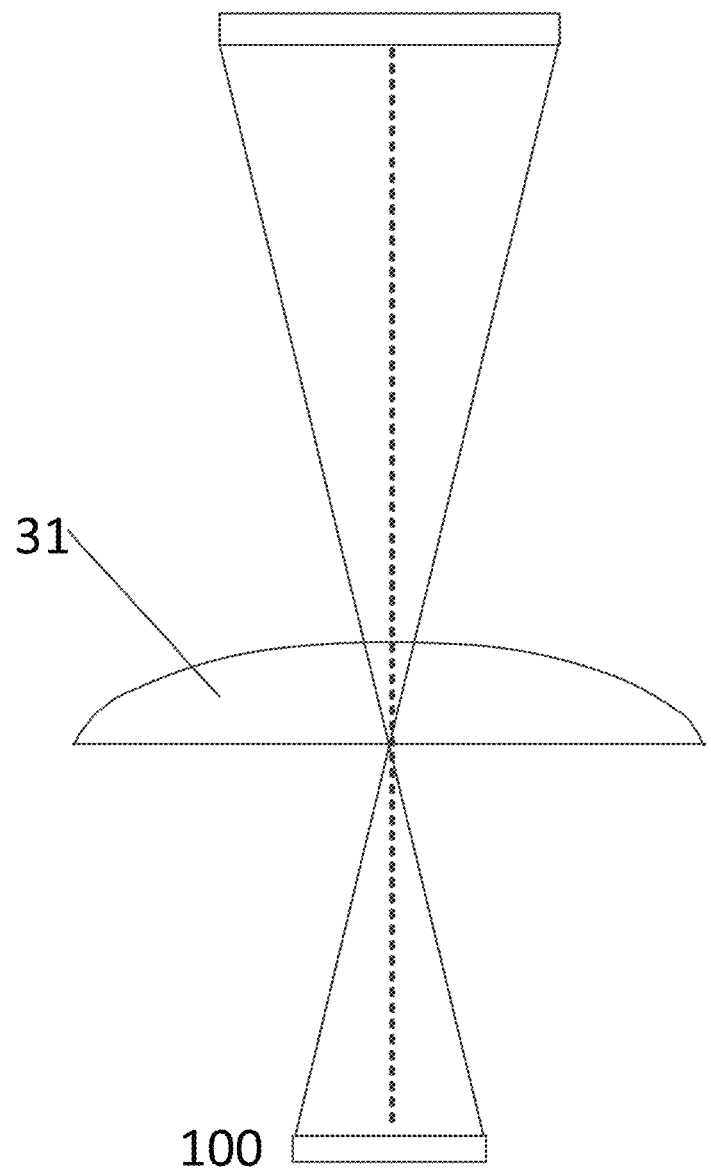
FIG. 15A is a schematic diagram of positions of a view region of a viewer, a liquid crystal lens, and a display panel when there is no bonding deviation between the display panel and the liquid crystal lens.
Figure 15B:
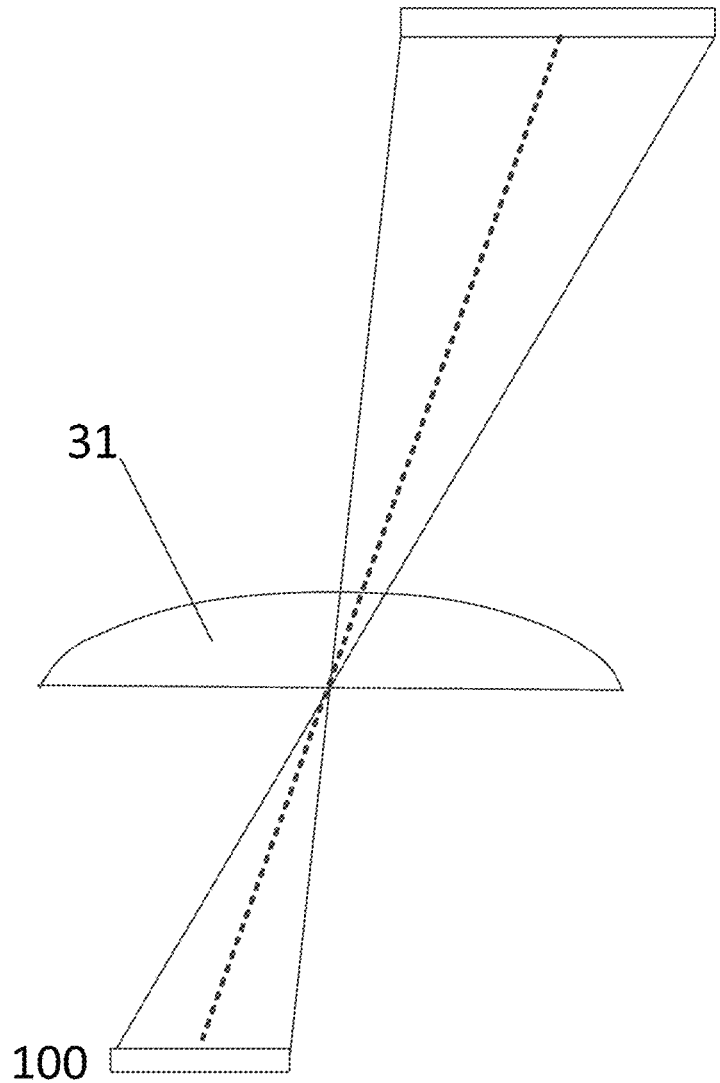
FIG. 15B is a schematic diagram of positions of a view region of a viewer, a liquid crystal lens, and a display panel when there is a bonding deviation between the display panel and the liquid crystal lens.
Figure 16:
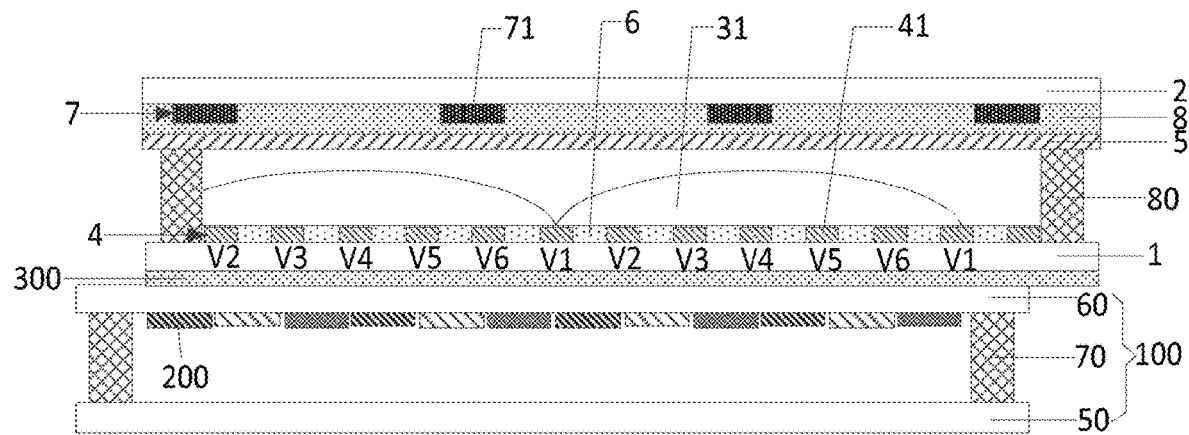
FIG. 16 is a schematic structural diagram of another display device according to an embodiment of the disclosure.

In a practical implementation, a 3D stereoscopic display technology requires a lens structure to modulate light, such that it is necessary to fix a period, a focal length, and a center position of a lens. Therefore, a high-precision technology, as well as fabrication and bonding apparatuses, is required. FIG. 14 is a schematic diagram showing that there is no deviation in alignment and bonding of the display panel and the liquid crystal lens. However, in an actual fabrication process, there is a bonding deviation, and the larger the size of the display panel 100 is, the greater the deviation value during the bonding is. A disadvantage of the bonding deviation lies in an offset of an optimal viewing position, thus requiring a deviation of a position of a viewer from a screen center in order to view a best 3D effect. This is inconsistent with our conventional viewing habits. As shown in FIG. 15A and FIG. 15B, FIG. 15A is a schematic diagram of a relationship between a position of a viewer, a position of a liquid crystal lens, and a position of the display panel 100 when there is no bonding deviation, and FIG. 15B is a schematic diagram of a relationship between a position of a viewer, a position of a liquid crystal lens, and a position of the display panel 100 when there is a bonding deviation. As can be seen, the position of the viewer in FIG. 15B deviates from the screen center. In order to solve the problem that the position of the viewer deviates from the screen center when there is a bonding deviation between the display panel and the liquid crystal lens, the above driving method according to embodiments of the disclosure may further include: when it is determined that an alignment deviation occurs between the display panel and the liquid crystal lens, adjusting a corresponding relationship between the liquid crystal lens units and the sub-electrodes according to a determined offset amount between the liquid crystal lens and the display panel, so that the adjusted liquid crystal lens units cover corresponding viewpoint pixels within the display panel. As shown in FIG. 14, when there is no alignment deviation between the display panel 100 and the liquid crystal lens, driving voltages of V1, V2, V3, V4, V5, V6, and V1 are successively applied to 7 sub-electrodes 41 corresponding to each liquid crystal lens unit 31; and as shown in FIG. 16, there is an alignment deviation between the display panel 100 and the liquid crystal lens, assuming that an offset amount between the liquid crystal lens and the display panel 100 is a width of a sub-electrode 41, the driving voltage V2 of the second sub-electrode 41 from the left in FIG. 14 is applied to the first sub-electrode 41 from the left, the driving voltages V3, V4, V5, V6, and V1 are successively applied to the second sub-electrode 41 to the sixth sub-electrode 41 from the left, and the driving voltages V1, V2, V3, V4, V5, V6, and V1 are successively applied to the corresponding 7 sub-electrodes 41 from the second liquid crystal lens unit 31, i.e., the corresponding relationship between the liquid crystal lens units 31 and the sub-electrodes 41 is adjusted, so that the adjusted liquid crystal lens units 31 cover the corresponding viewpoint pixels within the display panel 100, i.e., one liquid crystal lens unit 31 covers 6 view regions. Therefore, in embodiments of the disclosure, according to the offset amount, the driving voltages may be changed for compensation. Although there is a lateral deviation of the liquid crystal lens relative to the display panel 100, after driving voltages of the sub-electrodes are changed, the liquid crystal lens can be kept at a same position as the liquid crystal lens in FIG. 14, and the optimal viewing position is still at the center of the display panel, thus solving the problem that there is a bonding deviation in FIG. 16.

When it is determined that the offset amount between the liquid crystal lens and the display panel 100 is less than the width of a sub-electrode 41, the driving voltages of the sub-electrodes may not be changed, and the drive may be performed using a driving method in the absence of a bonding deviation; and when it is determined that the offset amount between the liquid crystal lens and the display panel 100 is greater than 1.5 times and less than 2 times as much as the width of a sub-electrode 41, the driving voltage V3 of the third sub-electrode 41 from the left in FIG. 14 is applied to the first sub-electrode 41 from the left in FIG. 16, and the driving voltages V4, V5, V6, and V1 are successively applied to the second sub-electrode 41 to the fifth sub-electrode 41 from the left, the driving voltages V1, V2, V3, V4, V5, V6, and V1 are successively applied to the corresponding 7 sub-electrodes 41 from the second liquid crystal lens unit 31, and so on.

Figure 17:
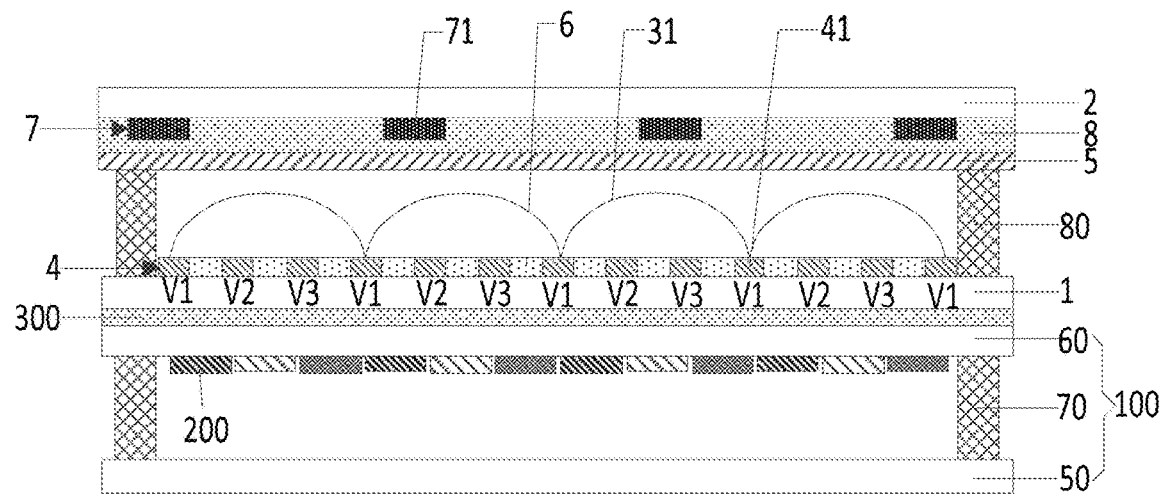
FIG. 17 is a schematic structural diagram of still another display device according to an embodiment of the disclosure.

In a specific implementation, liquid crystal lens units with different periods (diameters) may be implemented by changing the driving voltages when lens structures remain unchanged. For example, reducing the period of the liquid crystal lens in FIG. 14 by half may be implemented by applying the driving voltages shown in FIG. 17. The driving voltages V1, V2, V3, and V1 are successively applied to corresponding 4 sub-electrodes 41 of each liquid crystal lens unit 31. Compared with FIG. 14, when the lens period in FIG. 17 is reduced by half, the number of liquid crystal lens units 31 is doubled, i.e., the resolution of each view region 200 is doubled, that is, FIG. 14 achieves a large number of view regions and a single view region with a low resolution, enabling viewing by a plurality of persons; and FIG. 17 achieves a small number of view regions and a single view region with a high resolution, enabling viewing by a single person. Therefore, the above driving method according to embodiments of the disclosure may further include: when it is determined that a plurality of persons views the display device, adjusting the number of sub-electrodes corresponding to one of the liquid crystal lens units to a first number; and when it is determined that a single person views the display device, adjusting the number of sub-electrodes corresponding to one of the liquid crystal lens units to a second number; where the first number is greater than the second number. A large number of view regions are required when a plurality of persons views the display device, such that the resolution is relatively low, and the driving method shown in FIG. 14 may be used; and a small number of view regions are required when a single person views the display device, such that the resolution is relatively high, and the driving method shown in FIG. 17 may be used.

In a specific implementation, the above driving method according to embodiments of the disclosure may further include: adjusting voltage signals applied to sub-electrodes corresponding to a liquid crystal lens unit at an edge of the liquid crystal lens, so that a focal length of a liquid crystal lens unit in an edge region is different from a focal length of a liquid crystal lens unit in a center region. The content of the above structural description shown in FIG. 12 may be referred to for the driving principle of this driving method, which will not be repeated here.

The display device may be any product or component with a display function, such as a mobile phone, a tablet computer, a television set, a display, a notebook computer, a digital photo frame, a navigator, etc. Other essential constituent parts of the display device should be understood by those skilled in the art, and neither will be repeated here, nor should be used as limitations of the disclosure. The problem-solving principle of this display device is similar to the problem-solving principle of the above liquid crystal lens. Therefore, the implementation of the above liquid crystal lens may be referred to for the implementation of this display device, and repetitions will not be repeated here.

In the liquid crystal lens, the display device, and the method for driving the same according to embodiments of the disclosure, on the one hand, voltages are applied to the first electrode and the second electrode to form an electric field between the first electrode and the second electrode, such that, under the action of the electric field, a refractive index of a liquid crystal layer changes, thereby adjusting a focal length of the liquid crystal lens unit; and on the other hand, a liquid crystal molecule is driven to deflect using the plurality of sub-electrodes, to achieve a parabolic distribution of optical phase delay amounts. However, due to the absence of an electrode structure in a gap region between two adjacent sub-electrodes, an optical delay amount may decrease in this region, thereby resulting in an unsmooth optical delay curve that affects performance of the liquid crystal lens. In embodiments of the disclosure, the first planarization layer is provided on a side of the first electrode facing the liquid crystal layer, to serve to planarize a film layer and underlay the liquid crystal lens unit, thereby smoothing the electric field, i.e., the delay curve is relatively smooth and has approximately identical curvature radiuses at different positions. In addition, because a simulated lens has a worst appearance at a connection position between formed adjacent liquid crystal lens units, the light-shielding layer is provided to shield light at the connection position between the adjacent liquid crystal lens units. When the liquid crystal lens according to embodiments of the disclosure is applied to 3D display, backlight cannot be emitted through a region corresponding to the connection position between the adjacent liquid crystal lens units, thereby reducing light crosstalk at an adjacent position between the liquid crystal lens units, and decreasing a crosstalk value of the 3D display device.

Although embodiments of the disclosure have been described, those skilled in the art can make additional alterations and modifications to these embodiments once they know about basic creative concepts. Therefore, the appended claims are intended to be interpreted as including embodiments and all alterations and modifications encompassed within the scope of the disclosure.

Obviously, those skilled in the art can make various alterations and modifications to embodiments of the disclosure without departing from the spirit and scope of embodiments of the disclosure. In this way, if these variations and modifications to embodiments of the disclosure are encompassed within the scope of the claims of the disclosure and equivalent technologies thereof, the disclosure is also intended to include these variations and modifications.

What is claimed is:

1. A liquid crystal lens, comprising:
    a first substrate;
    a second substrate arranged opposite to the first substrate;
    a liquid crystal layer located between the first substrate and the second substrate and comprising a plurality of liquid crystal lens units;
    a first electrode located on a side of the first substrate facing the liquid crystal layer, the first electrode comprising a plurality of independent sub-electrodes, wherein each of the liquid crystal lens units corresponds to an identical number of the sub-electrodes, and there is a sub-electrode at an adjacent position between adjacent liquid crystal lens units; wherein each liquid crystal lens unit corresponds to a plurality of sub-electrodes, and an orthogonal projection of one of the plurality of sub-electrodes on the first substrate covers a center of an orthogonal projection of the liquid crystal lens unit on the first substrate;
    a second electrode located on a side of the second substrate facing the liquid crystal layer, the second electrode being a planar electrode; wherein the first electrode and the second electrode are configured to form an electric field to drive a liquid crystal molecule of the liquid crystal layer to rotate and adjust a curvature of the liquid crystal lens unit;
    a first planarization layer located on a side of the first electrode facing the liquid crystal layer, wherein the first planarization layer is configured to smooth an intensity variation curve of the electric field of the liquid crystal lens unit; and
    a light-shielding layer located between the first substrate and the second substrate, wherein an orthographic projection of the light-shielding layer on the first substrate covers an orthographic projection of the sub-electrode at the adjacent position between the adjacent liquid crystal lens units on the first substrate;
    wherein the liquid crystal lens further comprises a first electrode wiring and a second electrode wiring, and the plurality of liquid crystal lens units is divided into liquid crystal lens units in a center region and liquid crystal lens units in an edge region; wherein sub-electrodes at same positions of the liquid crystal lens units in the center region are electrically connected with a same first electrode wiring, and sub-electrodes at same positions of the liquid crystal lens units in the edge region are electrically connected with a same second electrode wiring.

2. The liquid crystal lens according to claim 1, wherein the light-shielding layer is located between the second substrate and the second electrode, and the liquid crystal lens further comprises a second planarization layer located between the light-shielding layer and the second electrode.

3. The liquid crystal lens according to claim 2, wherein the plurality of sub-electrodes is a plurality of strip-shaped sub-electrodes arranged in parallel with each other, the plurality of liquid crystal lens units is arranged in parallel, and an extension direction of the strip-shaped sub-electrodes is same as an extension direction of the liquid crystal lens units.

4. The liquid crystal lens according to claim 3, wherein the light-shielding layer comprises a plurality of independent strip-shaped light-shielding parts, and there is one-to-one correspondence between the strip-shaped light-shielding parts and strip-shaped sub-electrodes at adjacent positions between adjacent liquid crystal lens units.

5. The liquid crystal lens according to claim 2, wherein the plurality of sub-electrodes corresponding to each of the liquid crystal lens units comprises a planar sub-electrode and a plurality of annular sub-electrodes centered on the planar sub-electrode.

6. The liquid crystal lens according to claim 5, wherein the light-shielding layer comprises a plurality of opening regions, and there is one-to-one correspondence between the opening regions and the liquid crystal lens units.

7. The liquid crystal lens according to claim 6, wherein the opening region has a triangular, square, or hexagonal shape.

8. The liquid crystal lens according to claim 1, wherein the light-shielding layer is located between the first substrate and the first electrode, and the liquid crystal lens further comprises a third planarization layer located between the light-shielding layer and the first electrode.

9. The liquid crystal lens according to claim 1, wherein the light-shielding layer is located between the first electrode and the first planarization layer, and a dielectric constant of the light-shielding layer is identical to a dielectric constant of the first planarization layer.

10. The liquid crystal lens according to claim 1, wherein a width of the light-shielding layer corresponding to the adjacent position between adjacent liquid crystal lens units is greater than 20 um.

11. A display device, comprising: a display panel and the liquid crystal lens according to claim 1 at a light-emitting side of the display panel.

12. A method for driving the display device according to claim 11, comprising:
 in a 3D display mode, applying a common voltage to the second electrode, and applying driving voltages to sub-electrodes in the first electrode corresponding to each of the liquid crystal lens units, to control liquid crystal in the liquid crystal layer to deflect and form a liquid crystal lens unit, and from a center to both edges of the liquid crystal lens unit, distributing the driving voltages applied to the sub-electrodes in a preset gradient.

13. The driving method according to claim 12, wherein the method further comprises:
 when it is determined that an alignment deviation occurs between the display panel and the liquid crystal lens, adjusting a corresponding relationship between the liquid crystal lens units and the sub-electrodes according to a determined offset amount between the liquid crystal lens and the display panel, so that the adjusted liquid crystal lens units cover corresponding viewpoint pixels within the display panel.

14. The driving method according to claim 12, wherein the method further comprises:
 when it is determined that a plurality of persons views the display device, adjusting a number of sub-electrodes corresponding to one of the liquid crystal lens units to a first number; and
 when it is determined that a single person views the display device, adjusting a number of sub-electrodes corresponding to one of the liquid crystal lens units to a second number; wherein
 the first number is greater than the second number.

15. The driving method according to claim 12, wherein the method further comprises:
 adjusting voltage signals applied to sub-electrodes corresponding to a liquid crystal lens unit at an edge of the liquid crystal lens, so that a focal length of a liquid crystal lens unit in an edge region is different from a focal length of a liquid crystal lens unit in a center region.

16. The liquid crystal lens according to claim 1, wherein arch heights of the liquid crystal lens units in the edge region are smaller than arch heights of the liquid crystal lens units in the center region.

* * * * *